United States Patent [19]

Kochem et al.

[11] Patent Number: 5,294,372
[45] Date of Patent: Mar. 15, 1994

[54] AQUEOUS DISPERSION OF INTRINSICALLY ELECTROCONDUCTIVE POLYALKOXYTHIOPHENES, A PROCESS FOR THEIR PREPARATION AND THEIR USE

[75] Inventors: Karl-Heinz Kochem, Taunusstein; Michael Schmidt, Oestrich-Winkel, both of Fed. Rep. of Germany

[73] Assignee: Hoechst Aktiengesellschaft, Frankfurt am Main, Fed. Rep. of Germany

[21] Appl. No.: 853,297

[22] Filed: Mar. 18, 1992

[30] Foreign Application Priority Data

Mar. 28, 1991 [DE] Fed. Rep. of Germany ....... 4110263

[51] Int. Cl.$^5$ ............................................. H01B 1/00
[52] U.S. Cl. ..................... 252/500; 252/518; 106/14.11; 528/377; 528/378; 427/384; 427/385.5; 427/388.1
[58] Field of Search .................. 252/500, 512, 518; 106/14.11; 528/377, 378; 427/384, 385.5, 388.1, 388.4

[56] References Cited

U.S. PATENT DOCUMENTS

| | | | |
|---|---|---|---|
| 4,493,872 | 1/1985 | Funderburk et al. | 428/332 |
| 4,711,742 | 12/1987 | Jen et al. | 252/500 |
| 4,880,508 | 11/1989 | Aldissi | 252/518 |
| 5,093,033 | 3/1992 | Feldhues et al. | 252/512 |
| 5,139,703 | 8/1992 | Jen et al. | 252/500 |

FOREIGN PATENT DOCUMENTS

| | | |
|---|---|---|
| 257573 | 3/1988 | European Pat. Off. |
| 328981 | 8/1989 | European Pat. Off. |
| 328982 | 8/1989 | European Pat. Off. |
| 3834526 | 4/1990 | Fed. Rep. of Germany |

OTHER PUBLICATIONS

Feldhues et al. "Polyalkoythiophenes Soluble Electrically Conducting Polymers" Synthetic Metals, vol. 28, 1989.
Elsenbaumer, et al, "Processible and Environmentally Stable Conducting Polymers", Synthetic Metals, vol. 15, 1986, pp. 169–174.
Patil, et al, "Water-Soluble Conducting Polymers", J. Am. Chem. Soc. 1987, 109, 1858–1859.
Havinga et al, "Self-Doped Water-Soluble Conducting Polymers", Polymer Bulletin 18, 1987, pp. 277–281.
Patil, et al, "Self-Doped Conducting Polymer", Synthetic Metals, vol. 20, 1987, pp. 151–159.
Armes, et al, "Aqueous Dispersions of Electrically Conducting Monodisperse Polypyrrole Particles" Journal of Colloidal and Interface Science, vol. 118, No. 2, Aug. 1987.
Armes et al, "Preparation and Characterization of Colloidal Dispersions of Polypyrrole Using Poly(2-Vinyl Pyridine)-Based Steric Stabilizers", Polymer, Mar. vol. 13, 1990, pp. 569–573.

Primary Examiner—Linda Skaling
Assistant Examiner—M. Kopec
Attorney, Agent, or Firm—Foley & Lardner

[57] ABSTRACT

An aqueous dispersion is described which contains electroconductive, doped, polyalkoxythiophene which is soluble in aprotic organic solvents and is insoluble in water. The dispersion has a residual solvent content of less than or equal to 25% by weight, based on the total weight of the dispersion. A process for the preparation of this dispersion and the use of the dispersion for forming coatings on substrates are also described.

16 Claims, No Drawings

AQUEOUS DISPERSION OF INTRINSICALLY ELECTROCONDUCTIVE POLYALKOXYTHIOPHENES, A PROCESS FOR THEIR PREPARATION AND THEIR USE

BACKGROUND OF THE INVENTION

There have been worldwide endeavors for some years to synthesize so-called "intrinsically" electroconductive polymers. These are taken to mean polymer materials which have an inherent conductivity without the addition of electroconductive substances such as metal powders or fibers, conductive black or the like. Examples of such polymers are polyacetylene, polypyrrole, polythiophene, polyaniline, polyparaphenylene, polyphenylene sulfide, etc. However, polyconjugated bonding systems of this type are only electroconductive in the doped state, i.e. they must be converted into a conductive state by means of an oxidant or reducing agent in an electrochemical or chemical reaction. However, all of the materials listed above are insoluble and infusible in the doped state i.e. are unsuitable for further processing.

Therefore, up to a few years ago, there were few concrete applications for intrinsically electroconductive polymers. A further disadvantage was the low stability of the novel materials, in particular in moist atmospheres.

In order to obtain processable electroconductive polymers, soluble, intrinsically electroconductive polymers were developed (cf. R. L. Elsenbaumer, K. Y. Jen and R. Oboodi, Synth. Met. 15 (1986), 169). In particular, doped polyalkoxythiophenes synthesized by electrochemical methods are distinguished by high stability (M. Feldhues et al., Synth. Met. 28 (1989), C487). In doped form, these materials are soluble in low percentages in organic aprotic solvents, such as toluene, THF, acetonitrile, diethylformamide and N-methylpyrrolidone, and are therefore suitable as base materials for the electroconductive and/or antistatic coating of substrates (EP-A-0 328 981, EP-A-0 257 573 and EP-A-0 328 982).

However, it has proven very disadvantageous in the production of such coatings on an industrial scale that organic solvents have to be used, since many organic solvents today require industrial post-combustion, which is very expensive and complex. Attempts are therefore increasingly being made, in particular for the continuous coating of flexible substrates, such as, for example, films, to employ aqueous systems in which at least a large part of the organic solvent has been replaced by water.

In principle, two methods are conceivable for obtaining aqueous coating formulations based on intrinsically electroconductive polymers. The first is the development of novel, water-soluble, conductive polymers (A. O. Patil et al., J. Am. Chem. Soc. 109 (1987), 1858; E. E. Havinga et al., Polymer Bulletin 18 (1987), 277; A. O. Patil et al., Synth. Met. 20 (1987), 151). A second method is the preparation of aqueous dispersions. However, industrial processing of the materials, which became known as a result of the new development of water-soluble polymers, has hitherto been unsuccessful due to only very low electrical conductivity values achieved of below 0.1 S/cm and due to poor stability in water.

S. P. Armes and M. Aldissi, Polymer 31 (1990), 569, describe the preparation of an aqueous polypyrrole dispersion. In the process described, a steric stabilizer (poly-2-vinylpyridylbutyl methacrylate) must be added in order to avoid particle agglomeration of the polypyrrole, which can only be dispersed with difficulty. The specific conductivity of the dried powder is from 1 to 2 S/cm. No suitability of the material for coating purposes has been disclosed.

S. P. Armes et al., J. Coll. Interf. Sci. 118 (1987), 410, likewise describes an aqueous polypyrrole dispersion, in which the dispersion stabilizer employed is polyvinyl acetate. The individual conductive particles (not the liquid dispersion) exhibit a specific conductivity of 5 S/cm at a particle diameter of from 100 to 150 nm. The properties of thin layers made from these dispersions are not described.

DE-A-38 34 526 describes the coating of substrates with free-flowing dispersions based on polyaniline. It is also possible to use aqueous media here. It is disadvantageous that, after coating is complete and the solvent has been removed, it is necessary to convert the layer chemically or electrochemically into the conductive form necessary for its later function.

In both cases, insoluble, intrinsically conductive polymers in the doped form are used. Aqueous dispersions of conductive polymers which are soluble in organic solvents have not been disclosed.

SUMMARY OF THE INVENTION

It is therefore an object of the present invention to provide an aqueous dispersion of an intrinsically electroconductive polymer which requires neither addition of stabilizers nor subsequent doping and which is suitable for the coating of substrates in order to achieve an electroconductive and/or antistatic layer.

Another object of the present invention is to provide coated articles having an electroconductive and/or antistatic layer made by a process comprising the steps of applying to a substrate an aqueous dispersion of an intrinsically electroconductive polymer which requires neither addition of stabilizers nor subsequent doping.

It is also an object of the present invention to provide a bag with heat-sealed edges and, an antistatic layer made by a process comprising the steps of applying to one side of a film an aqueous dispersion comprising electroconductive, doped, polyalkoxythiophene.

In accomplishing these objects, there has been provided in accordance with one aspect of the present invention an aqueous dispersion containing, an electroconductive polyalkoxythiophene which is insoluble in water, but soluble in dipolar aprotic organic solvents, the aqueous dispersion having a maximum residual solvent content of about 25%.

According to another aspect of the present invention, there is provided, a bag with heat-sealed edges, made by a process comprising the steps of applying to one side of a film comprising at least one functional layer on the second side, an aqueous dispersion comprising electroconductive doped polyalkoxythiophene, to produce a coated film; laminating the second side of the coated film with a heat-sealable film to produce a coated laminated film; forming a bag by folding; and heat-sealing the bag with the coated side on the outside of the bag.

According to still another aspect of the present invention, there is provided, a bag with heat-sealed edges, made by a process comprising the steps of applying to one side of a film an aqueous dispersion comprising electroconductive, doped, polyalkoxythiophene, to produce a coated film; applying to one side of a heat-sealable film an aqueous dispersion comprising electroconductive, doped, polyalkoxythiophene, and a suitable binder, to produce a coated heat-sealable film; laminating the uncoated side of said coated film with the uncoated side of the heat-sealable film to produce a coated laminated film; forming a bag by folding; and heat sealing the bag.

Further objects, features and advantages of the present invention will become apparent from the detailed description of preferred embodiments that follows.

DETAILED DESCRIPTION OF THE PREFERRED EMBODIMENTS

The preparation of suitable polyalkoxythiophenes is described in EP-A-0 257 573. This application discloses intrinsically electroconductive polymers, preferably oligomers, which are synthesized by electrochemical methods and, in the oxidized form, are fully soluble in dipolar aprotic solvents at room temperature and which comprise structural units of the formula:

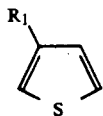

in which $R_1$ is a $C_1$- to $C_{12}$-, preferably $C_1$- to $C_4$-alkoxy group. The monomer units are bonded to one another in the 2-position and/or 5-position.

In the oxidized form, the electroconductive polymers contain the corresponding number of anions, preferably anions of the conductive salt employed in the electrolysis preparation process, to compensate for the positive charges on the polymer chain. Examples are: $BF_4^-$, $PF_6^-$, $SbF_6^-$, $SbCl_6^-$, $FeCl_4^-$ and $[Fe(CN)_6]^{3-}$, etc.

In order to obtain the aqueous dispersions according to the invention, the conductive polymer is first dissolved in a dipolar aprotic solvent (for example N-methyl-pyrrolidone). In addition, one or more nonconductive binders are preferably added to this solution; these binders have the task of providing the later layer with mechanical stability and better adhesion. These binders should likewise be soluble or dispersible in the same solvent and additionally in water. The solution is then added dropwise to water, the dispersion forming being mixed permanently. If desired, additives (flow-control agents, wetting agents) can be added to the dispersion forming.

The dispersion prepared in this way has a solids content of from 2 to 15% by weight, preferably of from 4 to 8% by weight, in each case based on the total weight of the dispersion. From 5 to 100% by weight, preferably from 10 to 30% by weight, of the dispersion comprises the above-described intrinsically conductive polyalkoxythiophenes, and from 0 to 95% by weight, preferably from 70 to 90% by weight, of the dispersion comprises nonconductive binders and other additives. The water content is from 95 to 75% by weight, preferably from 80 to 90% by weight; the residual solvent content is between 5 and 25% by weight, preferably between 10 and 20% by weight.

The dispersion according to the invention is particularly suitable for coating a very wide variety of substrates, preferably films made of polyester, polypropylene, polyvinyl chloride, polyacetate, polyethylene, polycarbonate and polyamide, by conventional methods of applying surface coatings, such as dipping, spraying and various printing processes, such as, for example, application by a smooth roller, application by an engraved roller, intaglio printing and flexographic printing. The dispersion according to the invention is particularly suitable for the continuous coating of film webs. In layers having thicknesses of less than 1 $\mu$m, preferably from 50 to 500 nm, antistatic, transparent layers having surface resistances of between $10^4$ and $10^9$ ohms, preferably between $10^6$ and $10^8$ ohms (DIN 53482) and a transparency of between 50% and 98% (ASTM 1003-61) can be produced in this way.

Films provided in this way with an antistatic layer can advantageously be converted into composite films, preferably using a film made from a heat-sealable material, preferably polyethylene, and applied by adhesive lamination. A film composite of this type can comprise, for example, a substrate film, for example a polyester film, which has been coated with the aqueous dispersion according to the invention and has a thickness in the range between 6 and 100 $\mu$m, preferably between 12 and 50 $\mu$m, and a heat-sealable film, for example a polyethylene film, having a thickness of between 20 and 200 $\mu$m, preferably between 25 and 75 $\mu$m. Heat-sealed packaging bags can then also be produced from a composite of this type, the polyester film coated with the dispersion according to the invention being arranged on the outside of the packaging bag. For an application of this type, the heat-sealable film used can then also be polyethylene film provided with an antistatic finish by means of conventional known agents.

The use of suitable heat-sealable binders also makes it possible for the heat-sealable film itself to be coated with the aqueous dispersion according to the invention and thus provided with an antistatic finish. In this way, heat-sealable composite films coated with an antistatic layer on both sides are obtained; these can be converted, for example, into bags.

A further very advantageous application of the dispersion according to the invention is the coating of metallized films. Commercially available metallized films, in particular metallized polyester or polypropylene films, are preferably produced by applying aluminum layers by vacuum vapor deposition in thicknesses in the range between 10 and 200 nm. Optically transparent metal layers having optical transparency values above about 30% are achieved at layer thicknesses of less than 20 nm. The surface resistances of transparent layers of this type are between about 30 and 200 ohms. Coating of a film of this type on the reverse, i.e. on the side not coated with the metallization, with the aqueous dispersion according to the invention and lamination of this film with the metal side against a heat-sealable film, for example made from polyethylene, gives a laminate which can be converted as described above to give heat-sealed packaging bags. The metal layer on the inside additionally provides a screening effect against high-frequency alternating fields.

The advantages of the antistatic layers applied with the aid of the aqueous dispersions described above compared with conventional, so-called chemical antistatic agents (for example fatty acid esters, quaternary ammonium salts, amines, etc.) are principally the significantly lower surface resistances (below $10^9$ ohms) and the independence of the antistatic action of the ambient atmospheric humidity. In addition, the corrosive effect on metals (for example in circuit boards) which is frequently present in the case of chemical antistatic agents is not observed in the case of the layers according to the invention.

The working examples below are intended to illustrate the invention in greater detail without representing a limitation to the embodiments represented explicitly.

EXAMPLE 1

18 g of electroconductive polyethoxythiophene (described in Example 1 of EP-A-0 257 573, specific electrical conductivity: 0.85 S/cm) and 102 g of a water-dispersible copolyester containing about 90 mol % of isophthalic acid and 10 mol % of the sodium salt of 5-sulfoisophthalic acid as the acid component and 100 mol % of ethylene glycol as the glycol component (described in EP-A-0 144 878) were dissolved in 376 g of N-methylpyrrolidone (NMP) at 60° C. The solution was then added dropwise with continuous stirring to 1488 g of water (80° to 90° C.) together with 10 g of ®Surfynol 104 (wetting agent from Air Products). The resultant dispersion has a total solids content of 7% by weight; the relative mixing ratio between the conductive polyethoxythiophene and the binder used is 15:85. The mixing ratio between water and NMP is 80:20.

This dispersion was used to continuously coat a polyester film (Hostaphan RN 36, width 340 nm) by means of a smooth roller (counter-rotating with an air brush) and dried at 125° C. in a circulating-air tunnel).

The coated film has a surface resistance of $5 \times 10^7$ ohms (DIN 53482) by means of a spring-tongue electrode), a transparency of 79% (ASTM 1003-61) and a haze of 14.5% (ASTM 1003-61). The scratch resistance of the layer corresponds to pencil hardness 1H (ASTM 3363). Scanning electron photomicrographs show a fineness of the dispersion particles in the dried layer of on average less than 100 nm.

EXAMPLE 2

0.53 g of electroconductive polyethoxythiophene from Example 1 is dissolved at room temperature in 12.1 g of NMP, and 0.18 q of ®Surfynol 104 is added. 20 g of ®Zinpol 1519 (an acrylic resin dispersed in water to give a solids content of 24%, obtainable from Worlée-Chemie) is diluted with 28 g of water; 0.12 g of ®Triton X100 (flow-control agent, Rohm und Haas) is subsequently added. The NMP solution is then incorporated dropwise into the aqueous phase. The finished dispersion contains 80% of water and 20% of NMP, the solids content is about 8.5% by weight, and the mixing ratio between polyethoxythiophene and ®Zinpol 1519 is 1:9.

This dispersion was then applied to a corona-pretreated polyester film (Hostaphan RN 25) by means of a wire doctor and dried for 2 minutes at 120° C. in a circulating-air drying cabinet. A surface resistance of $3 \times 10^7$ ohms and a transparency of 81% were achieved. The adhesion and wipe resistance were good, and the scratch resistance was 1H.

EXAMPLE 3

A $200 \times 300$ mm sample of a polyester film antistatically coated on one side as in Example 1 (thickness 36 μm, transparency 79%, surface resistance of the coated side $5 \times 10^7$ ohms) was adhesive-laminated with a single-layer film of low density polyethylene (LDPE) having a thickness of 50 μm. To this end, the uncoated side of the polyester film was coated with a two-component polyurethane-based adhesive by means of a 12 μm hand coater, placed together with the LDPE film and dried for one minute at 40° C. in a circulating-air oven. The transparency of the resultant film laminate was 77%, and the bond strength, determined by means of a T-peel test, was 4 N/15 mm of strip width. Heat-sealed bags were produced from the resultant film laminate, with the antistatic coating on the polyester film being arranged on the outside of the bag. The polyethylene sides of the laminate were heat-sealed for 0.5 s at 160° C. and 0.15 bar in a low-pressure heat-sealing unit. The seal strength, determined by the T-peel method, was 25 N/15 mm of strip width.

We claim:

1. An aqueous dispersion comprising electroconductive, polyalkoxythiophene which is soluble in aprotic organic solvents, said dispersion having a residual organic solvent content of at least about 5% by weight and less than or equal to 25% by weight, based on the total weight of the dispersion.

2. A dispersion according to claim 1, wherein said electroconductive polyalkoxythiophene comprises structural units of the formula

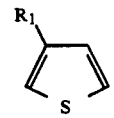

in which $R_1$ is a $C_1$–$C_{12}$-alkoxy group, and the monomer units are bonded to one another in the 2-and/or 5-position.

3. A dispersion according to claim 1, additionally containing at least one nonconductive binder which is dispersible or soluble in water.

4. A dispersion according to claim 2, wherein said $R_1$ is a $C_1$–$C_4$-alkoxy group.

5. A dispersion according to claim 1, wherein said residual organic solvent content is 10 to 20% by weight.

6. A dispersion according to claim 1, wherein said residual organic solvent is N-methylpyrrolidone.

7. A dispersion according to claim 1, wherein the water content is 95 to 75% by weight.

8. A dispersion according to claim 7, wherein said water content is 80 to 90% by weight.

9. A process for the preparation of a dispersion according to claim 1, comprising the steps of:
   (a) dissolving the electroconductive polyalkoxythiophene in at least one dipolar, aprotic solvent; and
   (b) dispersing the solution in water.

10. A process for the preparation of a dispersion according to claim 3 comprising the steps of:
    (a) dissolving the electroconductive polyalkoxythiophene in at least one dipolar aprotic solvent; and
    (b) dispersing or dissolving said binder in said solvent;
    (c) dispersing the solution in water.

11. An aqueous dispersion comprising electroconductive, polyalkoxythiophene which is soluble in aprotic organic solvents, said dispersion having a residual organic solvent content of at least about 5% by weight and less than or equal to 25% by weight, a water content of 95 to 75% by weight, and a solids content of 2 to 15% by weight, based on the total weight of the dispersion.

12. A dispersion according to claim 11, wherein said residual organic solvent content is 10 to 20% by weight.

13. A dispersion according to claim 11, wherein said solids content is 4 to 8% by weight.

14. A dispersion according to claim 11, wherein said water content is 80 to 90% by weight.

15. A dispersion according to claim 11, wherein said residual organic solvent is N-methylpyrrolidone.

16. A dispersion according to claim 11, additionally containing at least one nonconductive binder which is dispersible or soluble in water.

* * * * *